(12) United States Patent
Asahi

(10) Patent No.: US 6,337,886 B1
(45) Date of Patent: Jan. 8, 2002

(54) BIT RATE-SELECTIVE TYPE OPTICAL RECEIVER, OPTICAL REGENERATIVE REPEATER AND AUTOMATIC BIT RATE DISCRIMINATING METHOD

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/075,336

(22) Filed: May 11, 1998

(30) Foreign Application Priority Data

May 12, 1997 (JP) .............................. 9-121277

(51) Int. Cl.⁷ ................................................ H03K 9/00
(52) U.S. Cl. ...................................... 375/316; 375/327
(58) Field of Search ................................ 375/340, 342, 375/327, 316

(56) References Cited

U.S. PATENT DOCUMENTS

| | | | | |
|---|---|---|---|---|
| 3,611,141 A | * | 10/1971 | Waters ........................ | 375/292 |
| 3,808,367 A | * | 4/1974 | Wigner et al. .............. | 375/365 |
| 5,386,311 A | * | 1/1995 | Shields ........................ | 359/189 |
| 5,621,755 A | * | 4/1997 | Bella et al. .................. | 375/219 |

FOREIGN PATENT DOCUMENTS

| | | |
|---|---|---|
| JP | 60-52144 | 3/1985 |
| JP | 60-116253 | 6/1985 |
| JP | 61-33055 | 2/1986 |
| JP | 2-305279 | 12/1990 |
| JP | 3-205942 | 9/1991 |
| JP | 5-191470 | 7/1993 |
| JP | 6-120936 | 4/1994 |

OTHER PUBLICATIONS

Japanese Office Action dated May 16, 2000, with partial translation.

* cited by examiner

Primary Examiner—Chi Pham
Assistant Examiner—Kevin M Burd
(74) Attorney, Agent, or Firm—McGinn & Gibb, PLLC

(57) ABSTRACT

A receiving apparatus includes a counter for counting for a prescribed period of time the number of bits having one of two different levels, out of bits forming a digital signal which is entered and having the two different levels, and supplying a count signal, a bit rate detector for calculating the bit rate of the digital signal from the count signal and supplying a multiplying factor selection signal, a differentiating circuit, into which the input digital signal is entered, for supplying a pulse signal at a varying point of the input digital signal, a rectifying circuit for accomplishing full-wave rectification of the pulse signal, and supplying a rectified pulse signal, a band-pass filter for passing harmonics of the clock component of the input digital signal contained in the rectified pulse signal, and a frequency dividing circuit, into which the harmonics are entered, for frequency-dividing the harmonics by a ratio set on the basis of the multiplying factor selection signal, and supplying a resultant frequency-divided clock signal.

15 Claims, 7 Drawing Sheets

PHASE DETECTION CHARACTERISTIC

BIT RATE-SELECTIVE TYPE OPTICAL RECEIVER, OPTICAL REGENERATIVE REPEATER AND AUTOMATIC BIT RATE DISCRIMINATING METHOD

BACKGROUND OF THE INVENTION

1. Field of the Invention

The present invention relates to an optical repeater useful for optical trunk transmission systems, and more particularly to a bit rate-selective type optical regenerative repeater which automatically discriminates the transmission rate and repeats optical signals accordingly.

2. Description of the Related Art

In a large capacity optical communications system, the bit rate of transmitted signals is selected according to the purpose of use out of a number of alternatives standardized as SDH. Therefore, for economical system architecture, it is desirable that the optical repeater to be installed in the system be operable at all bit rates.

According to the prior art, optical regenerating repeaters of bit rate-independent type used for repeating of optical signals have only one or two of the so-called 3R functions (reshaping, retiming and regenerating), but not the retiming function. Such an optical regenerative repeater shapes the waveform without regenerating timing clock signals from the received optical signals, and converts the received signals into optical signals to be outputted. As a result, it regenerates and repeats not only the optical signals as such but also noise. Therefore, the signal waveform and above all the duty ratio of digital signals are deteriorated, resulting in an adverse effect on transmission characteristics.

To avert this problem, a configuration in which optical signals modulated with a clock signal synchronized with data signals are transmitted over a separate path from that for optical signals modulated with data signals is proposed. However, such bit rate-independent type optical regenerative repeaters according to the prior art are both expensive and unreliable, because they require duplication of the optical transmitting/receiving circuit to transfer clock signals separately from data signals. Where data signals and clock signals are transmitted over the same optical fiber path to reduce the cost of the path, wavelength division multiplexing (WDM) is required, resulting in the problem that, if such an optical regenerative repeater is to be extended into a WDM transmission system, the optical wavelength band cannot be effectively used.

SUMMARY OF THE INVENTION

An object of the present invention is to provide an inexpensive bit rate-selective type optical regenerative repeater compatible with a plurality of bit rates and not wasteful in the use of an optical wavelength band.

According to the invention, there is provided a bit rate-selective type optical regenerative repeater provided with a photoelectric converter, a bit rate-selective type discriminator/ regenerator and an electro-optical converter, wherein: the photoelectric converter converts input an optical signal into an electric signal; the bit rate-selective type discriminator/regenerator discriminates and regenerates the electric signal which is entered; and the electro-optical converter converts the discriminated/regenerated signal supplied from the bit rate-selective type discriminator/regenerator into an optical signal.

The bit rate-selective type discriminator/regenerator has a bit rate-selective type timing extractor and a discriminating circuit. The bit rate-selective type timing extractor extracts a timing component from an input digital signal. The discriminating circuit discriminates and regenerates the input digital signal with the timing component.

The bit rate-selective discriminator/regenerator may as well be provided with a phase-locked loop (PLL) circuit, a discriminating circuit, a specific pattern detecting circuit and a control circuit. The PLL circuit multiplies the clock component in the input digital signal by a factor set on the basis of a multiplying factor selection signal entered from outside, and supplies a resultant multiplied clock signal. The discriminating circuit discriminates and regenerates the input digital signal with the multiplied clock signal, and supplies a resultant discriminated/regenerated signal. The specific pattern detecting circuit checks the discriminated/regenerated signal as to whether or not it has a specific pattern inserted into the input digital signal in advance, and supplies the result of checking as detection signal. The control circuit, into which the detection signal is entered, generates and supplies the multiplying factor selection signal to vary the multiplying factor successively until any of the detection signals indicates the presence of the specific pattern.

Alternatively, the bit rate-selective discriminator/regenerator may be provided with a differentiating circuit, a rectifying circuit, a band-pass filter, a frequency dividing circuit, a specific pattern detecting circuit and a control circuit. The differentiating circuit, into which the input digital signal is entered, supplies a pulse signal at a varying point of the input digital signal. The rectifying circuit accomplishes full-wave rectification of the pulse signal, and supplies a rectified pulse signal. The band-pass filter passes harmonics of the clock component of the input digital signal contained in the rectified pulse signal. The frequency dividing circuit frequency-divides the harmonics, which are entered into it, by a ratio set on the basis of the multiplying factor selection signal, and supplies a resultant frequency-divided clock signal. The discriminating circuit discriminates and regenerates the input digital signal with the frequency-divided clock signal, and supplies a resultant discriminated/regenerated signal. The specific pattern detecting circuit checks the discriminated/regenerated signal as to whether or not it has a specific pattern inserted into the input digital signal in advance, and supplies the result of checking as detection signal. The control circuit, into which the detection signal is entered, generates and supplies the multiplying factor selection signal to vary the frequency dividing ratio successively until any of the detection signals indicates the presence of the specific pattern.

The bit rate-selective timing extractor is provided with an automatic bit rate discriminator and a PLL circuit. The automatic bit rate discriminator calculates the bit rate of an input digital signal, and supplies a multiplying factor selection signal. The PLL circuit multiplies the clock component in the input digital signal by a factor set on the basis of the multiplying factor selection signal entered from outside, and supplies a resultant multiplied clock signal.

The bit rate-selective type timing extractor may as well be provided with an automatic bit rate discriminator, a differentiating circuit, a rectifying circuit, a band pass filter, and a frequency dividing circuit. The automatic bit rate discriminator calculates the bit rate of an input digital signal, and supplies a multiplying factor selection signal. The differentiating circuit, into which the input digital signal is entered, supplies a pulse signal at a varying point of the input digital signal. The rectifying circuit accomplishes full-wave rectification of the pulse signal, and supplies a rectified pulse signal. The band-pass filter passes harmonics of the clock component of the input digital signal contained in the rectified pulse signal. The frequency dividing circuit frequency-divides the harmonics, which are entered into it, by a ratio set on the basis of the multiplying factor selection signal, and supplies a resultant frequency-divided clock signal.

Alternatively, the bit rate-selective type timing extractor may be provided with a plurality of timing extracting circuits set to extract mutually different frequencies, a selector circuit, and a selection control circuit. Each of the timing extracting circuits is provided with a differentiating circuit, a rectifying circuit, a band-pass filter and a power detecting circuit. The differentiating circuit, into which the digital signal is entered, supplies a pulse signal at a varying point of the input digital signal. The rectifying circuit accomplishes full-wave rectification of the pulse signal, and supplies a rectified pulse signal. The band-pass filter, into which the rectified pulse signal is entered, selectively supplies a sine wave signal having a predetermined frequency. The power detecting circuit, into which the sine wave signal is entered, supplies a power signal having a parameter which varies monotonously with the input signal power. The plurality of timing extracting circuits are set to different predetermined frequencies. The selecting circuit, into which the sine wave signals are entered, selects one of the input signals in accordance with a selection signal entered from outside, and supplies the selected sine wave signal. The selection control circuit, into which the power signals are entered, generates the selection signal for selecting the sine wave signal having the greatest power, and feeds it to the selecting circuit.

The automatic bit rate discriminator is provided with a counter and a bit rate detector. The counter counts for a prescribed period of time the number of bits having one of two levels of bits constituting the digital signals which are entered, and supplies a count signal. The bit rate detector calculates the bit rate of the digital signals from the count signal.

The automatic bit rate discriminator may as well be provided with a counter and a one bit length detecting circuit. The counter, into which a digital signal and a clock signal having a frequency not lower than the bit rate of the digital signal are entered, measures the duration of one of two levels of bits constituting the digital signal in terms of the number of cycles of the clock, and supplies it as bit length signal. The one bit length detecting circuit, into which the bit length signal is entered, calculates the shortest duration of the one of two levels.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First, before describing the optical regenerative repeater according to the invention, conventional optical regenerative repeaters will be described to facilitate understanding of the invention.

Figure 1:
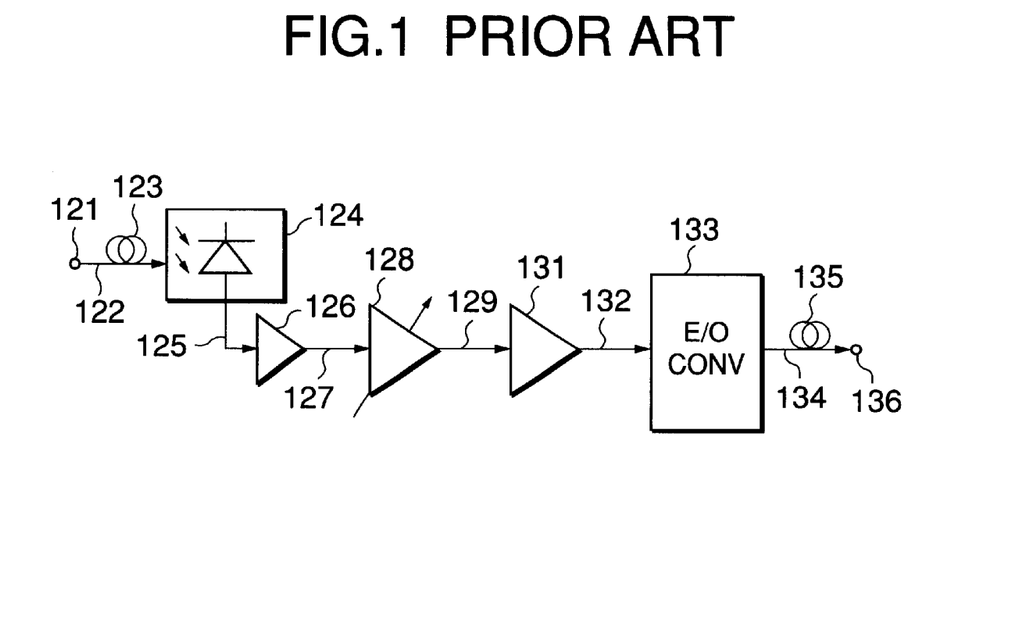
FIG. 1 is a block diagram illustrating the configuration of a first bit rate-independent type optical regenerative repeater according to the prior art.

FIG. 1 illustrates the configuration of one example of optical regenerative repeater according to the prior art. Conventional bit rate-independent type optical regenerative repeaters use a configuration dispensing with a timing extracting function.

FIG. 1 illustrates one of such optical regenerative repeaters according to the prior art. In this optical regenerative repeater, an optical signal 122 intensity-modulated with a data signal is entered into an optical signal input terminal 121. The optical signal 122 transmitted over an optical fiber 123 is brought to incidence on a photodiode 124 and converted into a photocurrent 125. It is then amplified by a preamplifier 126 and converted into an electric data signal 127. The electric data signal is entered into a variable gain amplifier 128, which amplifies the entered electric data signal 128 to make its amplitude conform to a preset constant value. The amplified electric data signal 129 is entered into a limiter amplifier 131, which shapes the electric data signal 129 into a square wave by limiter-amplifying it.

The shaped electric data signal 132 is entered into an electro-optical converter (E/O CONV) 133, which converts the waveform-shaped electric data signal 132 into an optical signal 134 and supplies it to an output terminal 136 via an optical fiber 135.

In this conventional optical regenerative repeater shown in FIG. 1, the waveform of the data signal is shaped without regenerating the timing of the received optical signal, and the shaped signal is again supplied as optical signal. Therefore, it is made possible to accomplish bit rate-independent regeneration and repeating of an optical signal having a bit rate within the band of the circuits constituting this optical regenerative repeater.

However, the prior art optical regenerative repeater illustrated in FIG. 1 regenerates and repeats not only the desired optical signal but also accompanying noise. Consequently, it entails the problem that such factors as the waveform of the signal and especially the duty ratio of the digital signal are deteriorated with an adverse impact on transmission characteristics.

Figure 2:
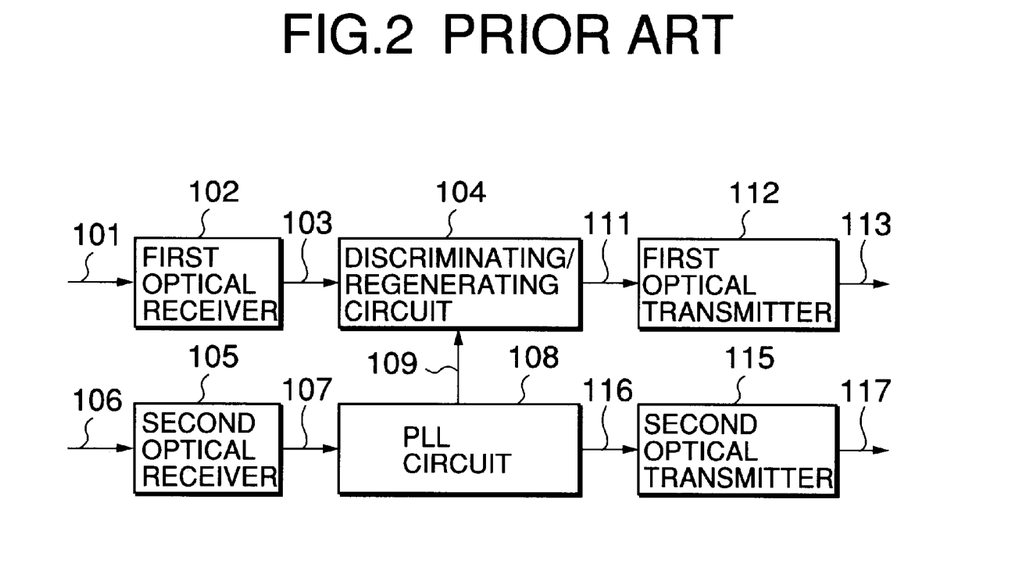
FIG. 2 is a block diagram illustrating the configuration of a second bit rate-independent type optical regenerative repeater according to the prior art.

FIG. 2 illustrates the configuration of a second example of optical regenerative repeater according to the prior art. This optical regenerative repeater, disclosed in the Gazette of the Japanese Patent Laid-open No. Hei 6-120936, is provided with a first optical receiver 102 for receiving a high speed optical signal 101, intensity-modulated with a high speed data signal, from an optical fiber constituting a transmission path not shown. High speed data 103 supplied from the first optical receiver 102 are entered into discriminating/regenerating means 104. On the other hand, a second optical receiver 105 is disposed to receive entry of an n-frequency-divided clock optical signal 106, which results from intensity-modulation of a main clock signal, synchronized with the high speed data signal, with an n-frequency-divided clock signal, and is received from the optical fiber constituting a transmission path. The second optical receiver 105 supplies an n-frequency-divided clock signal 107, which is entered into a phase-locked loop (PLL) circuit 108.

The PLL circuit 108 has a voltage-controlled oscillator (VCO) within. The phase of a clock signal generated by this VCO is controlled to synchronize with the n-frequency-divided clock signal 107 supplied from the second optical receiver 105. An extracted clock signal 109, which makes up the output of the VCO, is supplied to the discriminating/regenerating circuit 104.

The discriminating/regenerating circuit 104, using the extracted clock signal 109, discriminates and regenerates the high speed data 103 supplied from the first optical receiver 102, and supplies regenerated data 111 to a first optical transmitter 112. The first optical transmitter 112 converts the regenerated data 111 into an optical signal, and delivers it, as high speed optical signal 113 to an optical fiber constituting a transmission path not shown. The n-frequency-divided clock optical signal 106, received by the second optical receiver 105, is converted into an optical signal 117 by a low speed side second receiver 115, and similarly delivered to the optical fiber constituting a transmission path.

According to this embodiment of the prior art shown in FIG. 2, the high speed optical signals and the n-frequency-divided clock signal, resulting from the frequency division of the main clock signal, synchronized with the high speed optical signal, by n are delivered to the optical transmission path. At a repeater station, the phase of a clock signal generated by internal circuits including the VCO (a signal of the same system as the main clock signal) is controlled with reference to the n-frequency-divided signal. An extracted clock signal, of the same system as the main clock signal and synchronized with the n-frequency-divided signals, is thereby obtained, and the high speed data are discriminated and regenerated with reference to the extracted clock signal. Regeneration and repeating of an optical signal, not dependent on the bit rate of the optical signal transmitted over the optical fiber constituting a transmission path, is thereby accomplished.

Figure 3:
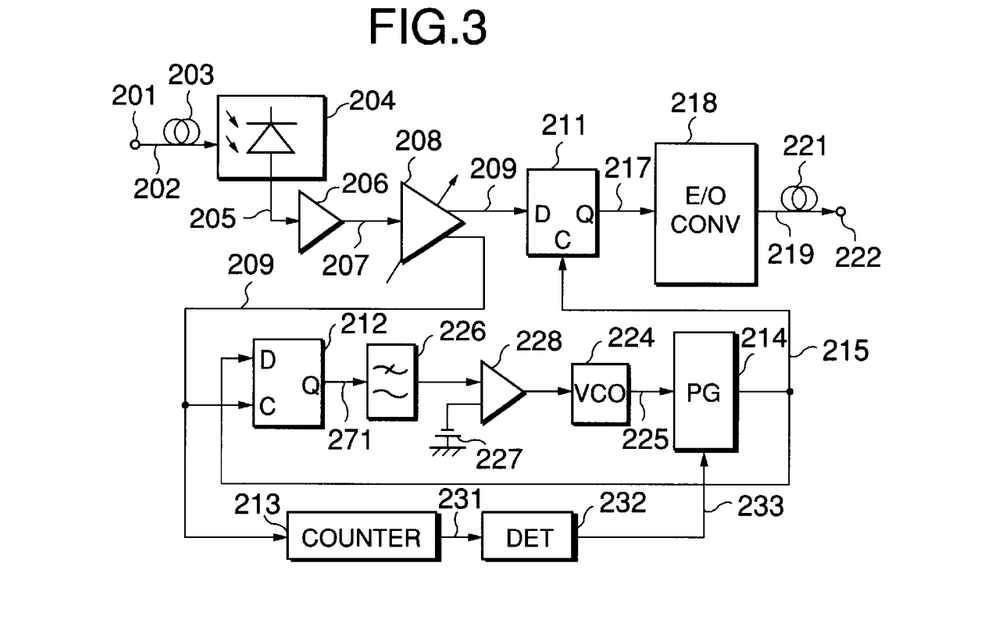
FIG. 3 is a block diagram illustrating a bit rate-selective type optical regenerative repeater, which is a first preferred embodiment of the present invention.

Next will be described the configuration and operation of the optical regenerative repeater according to the present invention. FIG. 3 illustrates an optical regenerative repeater, which is a first preferred embodiment of the invention.

Referring to FIG. 3, an optical signal 202 intensity-modulated with a data signal is entered into an optical signal input terminal 201 of this optical regenerative repeater. The optical signal transmitted over an optical fiber 203 is brought to incidence on a photodiode 204, and converted into a photocurrent 205, which is amplified by a preamplifier 206 and converted into an electric data signal 207. The electric data signal 207 is entered into a variable gain amplifier 208, which amplifies the entered electric data signal 207 to give it a preset constant amplitude. The amplified electric data signal 209 is entered into a discriminating circuit 211, a phase comparator 212, and a pulse counter 213.

The discriminating circuit 211, into whose input terminal D is entered the electric data signal 209, receives the entry of a clock signal 215 supplied from a pulse generator (PG) 214 into its clock terminal C, and discriminates and regenerates an electric data signal 217 from its output terminal Q. The data signal 217 is entered into an electro-optical (E/O) converter 218, which converts the discriminated and regenerated electric data signal 217 into an optical signal 219 and supplies the converted signal to an output terminal 222 via an optical fiber 221.

Incidentally, the PG 214 is a circuit, receiving from a voltage controlled oscillator (VCO) 224 the supply of its output clock 225, to generate a clock signal 215 of a frequency equal to 1/N (N is a natural number) of the frequency of the clock 225. The VCO 224 oscillates in the vicinity of the same frequency as the highest bit rate at which the optical regenerative repeater, which is this embodiment of the invention, can receive, and on the basis of this frequency the PG 214 generates the clock signal 215. This VCO 224, together with the phase comparator 212, a low pass filter 226, an operational amplifier 228 one of whose ends is supplied with a reference voltage 227, and the PG 214, constitutes a PLL circuit. Into the PG 214 is entered a discrimination result 233 of a bit rate detector (DET) 232, into which a count 231 of the pulse counter 213 for one second is entered, for detecting the bit rate.

Figure 4:
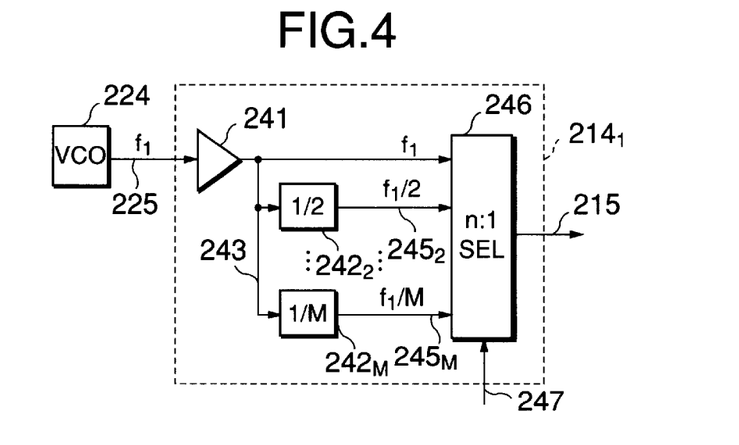
FIG. 4 is a block diagram illustrating a first specific example of pulse generator in the first preferred embodiment of the invention.

FIG. 4 illustrates a first specific example of PG in this embodiment of the invention. A PG 2141 consists of an amplifier 241, frequency dividing circuits 2422 to 242M, and an n:1 selecting circuit (n:1SEL) 246.

To the PG 2141 is supplied an output clock of f1 in frequency from the VCO 224. This output clock 225 is amplified by the amplifier 241 to have an amplitude of a logical level. The amplified output clock 243 is divided in frequency by 2 to M by the frequency dividing circuits 2422 to 242M, respectively. The output clock 243 supplied from the amplifier 241 and the output clocks 2452 to 245M of the frequency dividing circuits 2422 to 242M, respectively, are entered into the n:1SEL 246, which selects, out of a total of n input signals comprising output clocks 243 and 2452 to 245M, one designated by a control signal 247, and supplies it. As a result of this selection, a clock signal 215 of a frequency matching the bit rate is supplied.

Figure 5:
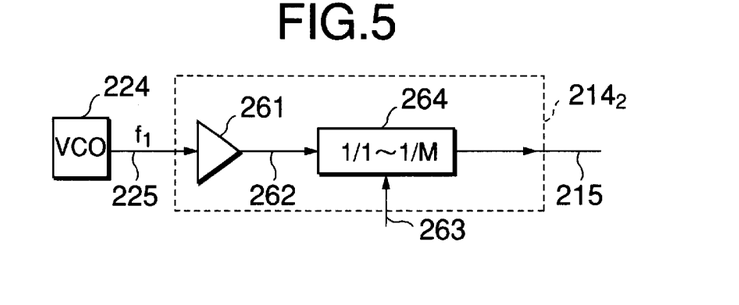
FIG. 5 is a block diagram illustrating a second specific example of pulse generator in the first embodiment of the invention.

FIG. 5 illustrates a second specific example of PG in this embodiment of the invention. A PG in this second specific example consists of an amplifier 261 and a frequency dividing circuit 264. The PG 2142 is supplied with an output clock 225 of f1 in frequency from the VCO 224. This output clock 225 is amplified by the amplifier 261 to have an amplitude of a logical level. The amplified output clock 262 is divided in frequency by the frequency dividing circuits 264. One frequency dividing ratio is designated out of 1/1 to 1/M by a control signal 263 entered from outside. The frequency dividing circuit 264 may be, for example, μPB487G, which is an IC manufactured by NEC Corporation (NEC). From the frequency dividing circuit 264 is supplied a clock signal 215 of a frequency matching the bit rate.

Further description will be made with reference back to FIG. 3. From the PG 214 is supplied the clock signal 215, which is entered into an input terminal D of the phase comparator 212. One of the electric data signals 209, which are the output of the variable gain amplifier 208, is entered into the comparing terminal C of the phase comparator 212. From the output terminal Q of the phase comparator 212 is supplied a phase difference signal 271, which is a signal corresponding to the phase difference between the clock signal 215 and the electric data signal 209. The phase difference signal 271 is entered into a PLL circuit comprising the low pass filter 226 and the operational amplifier 228 among other things. In this PLL circuit, the phase difference signal 271 is used to bring into coincidence the phase of the varying point of the level of the output signal of the PG 214 and the phase of the varying point of the output data of the variable gain amplifier 208.

Figure 6:
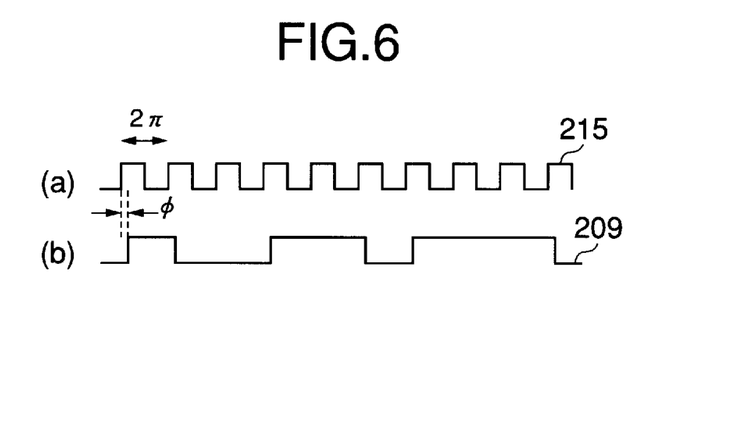
FIG. 6 comprises different waveform diagrams for describing the operation of a phase comparator for use in the first embodiment of the invention, wherein: (a) shows the waveform of a clock signal 215 supplied from a pulse generating circuit 214 referred to in FIG. 3, and (b), the waveform of an electric data signal 209 supplied from a variable gain amplifier 208 referred to in FIG. 3.
Figure 7:
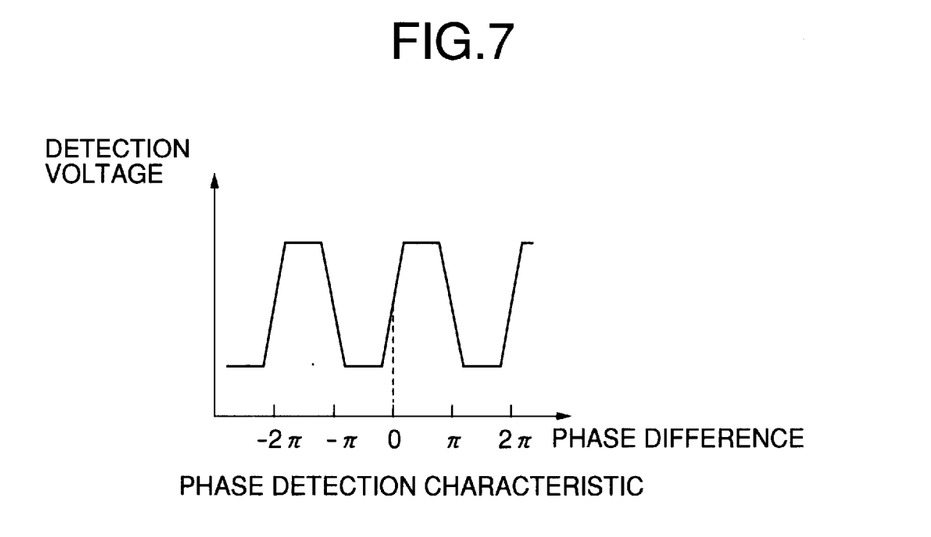
FIG. 7 shows the phase detection characteristic relative to the phase difference âμ between two input waveforms entered into the phase comparator in the first embodiment of the invention.

Now will be described the operation of the phase comparator 212 with reference to FIG. 6. FIG. 6(a) shows the waveform of the clock signal 215 supplied from the PG 214 referred to in FIG. 3. FIG. 6(b) shows the waveform of the electric data signal 209 supplied from the variable gain amplifier 208 referred to in FIG. 3. The phase comparator 212, referred to in FIG. 3, latches the clock signal 215 with the electric data signal 209. Extraction of the average value of such latched signals by the low pass filter 226 (FIG. 3) gives the phase detection characteristic shown in FIG. 7 relative to the phase difference âll between the two input waveforms shown in FIGS. 6(a) and (b).

The pulse counter 213 referred to in FIG. 3 counts every second the number of pulses contained in the electric data signal 209 supplied from the variable gain amplifier 208. The DET 232, using this per-second count 213 of the number of pulses, detects the bit rate of the optical signal 202. Detection of the bit rate uses the relationships shown in FIG. 9, i.e. the relative magnitudes of the count, threshold A and threshold B. A detection result 233 is entered into the PG 214 to set the frequency dividing ratio.

Figure 8:
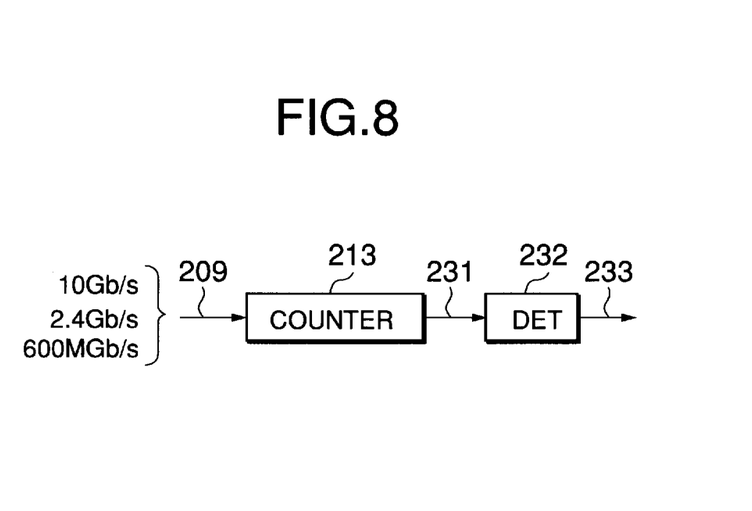
FIG. 8 is a block diagram illustrating the pulse counter and the bit rate detector in the first embodiment of the invention.
Figure 9:
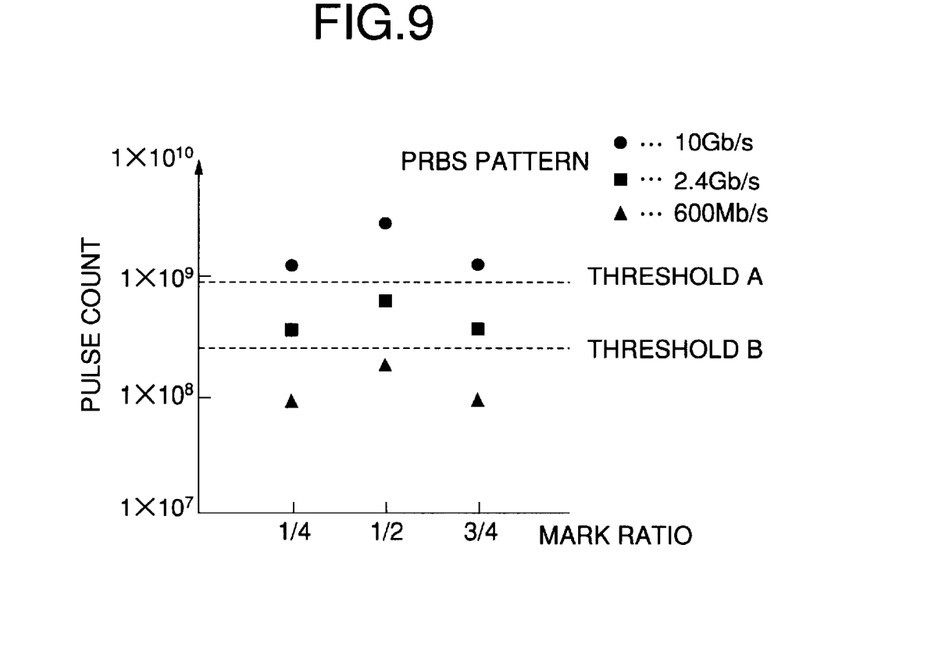
FIG. 9 is a diagram for describing the relationships between three kinds of bit rates and the pulse count in the first embodiment of the invention.

FIGS. 8 and 9 are intended to help explain the principle of bit rate detection. Of the two diagrams, FIG. 8 illustrates a case in which electric data signals 209 of different bit rates are entered in the pulse counter 213 referred to in FIG. 3. For description here, three different bit rates including 10 Gb/s, 2.4 Gb/s and 600 Mb/s, used as standard transmission rates in a synchronous digital hierarchy (SDH) or a synchronous optical network (SONET), are referred to as examples.

In FIG. 9, the per-second pulse counts of the pulse counter at the three different bit rates are plotted on the vertical axis, and the mark ratio of the entered electric data signals, on the horizontal axis. The pulse counter 213 referred to in FIG. 8 delivers to the DET 232 the count of pulses of the entered electric data signal 209 for one second as per-second count 231. FIG. 9 also shows pulse counts in a pseudorandom pattern at the bit rates of 10 Gb/s, 2.4 Gb/s and 600 Mb/s against a mark ratio ranging from ¼ to ¾.

As is evident from this FIG. 9, for the electric data signal having a mark ratio in the range of ¼ to ¾, the count 231 as the result of pulse counting for one second is substantially proportional to the bit rate. Accordingly, by setting the thresholds A and B as shown in FIG. 9 in the DET 232, it is possible to detect the bit rate. Especially for the optical signal interface of the SDH and SONET, where data signals are scrambled using a pseudorandom pattern equivalent to PN7, they can be expected to be within the range of mark ratio. Therefore, a bit rate discriminating circuit like that in this embodiment of the invention can effectively operate.

As described above, in the first preferred embodiment of the present invention, discrimination and regeneration are accomplished by detecting the bit rate of an entered optical signal and regenerating a clock synchronized with it.

Figure 10:
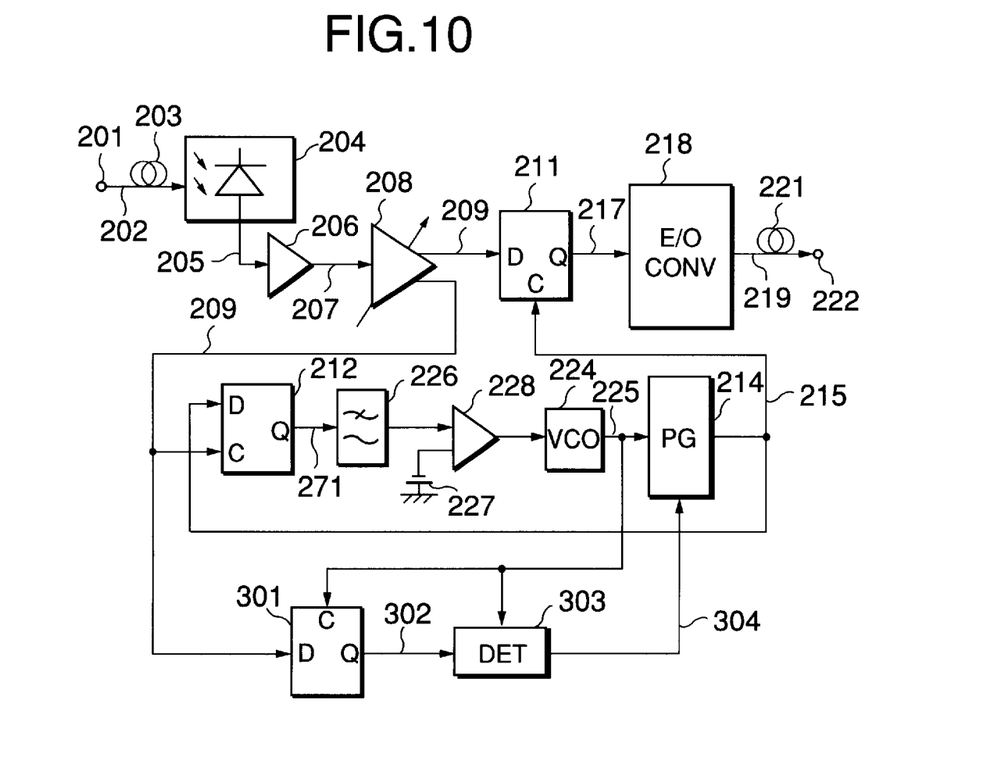
FIG. 10 is a block diagram illustrating the configuration of a bit rate-selective type optical regenerative repeater, which is a second preferred embodiment of the invention.

FIG. 10 illustrates the configuration of a bit rate-selective type optical regenerative repeater, which is a second preferred embodiment of the invention. In this diagram, the same parts as in the first embodiment illustrated in FIG. 3 are assigned the same reference signs, and their description is dispensed with as appropriate. In this optical regenerative repeater which is the second embodiment of the invention, an electric data signal 209 is supplied to an input terminal D of a D-type flip-flop 301. A latch output 302 supplied from an output terminal Q of the D-type flip-flop 301 is supplied to a one-bit length detecting circuit 303, which detects, on the basis of an input signal, the one-bit length of a received optical signal. An output clock 225 supplied from the VCO 224 is supplied to a clock terminal C of the D-type flip-flop 301 and to the one-bit length detecting circuit 303, whose detection output 304 is entered into the PG 214 to be used in setting the frequency dividing ratio.

The operation of this optical regenerative repeater, which is the second preferred embodiment of the invention, will now be described. The electric data signal 209, which is the output of the variable gain amplifier 208 is latched by the D-type flip-flop 301. The output clock 225, which is the output of the VCO 224, is used for the latching. The VCO 224 oscillates in the vicinity of the same frequency as the highest bit rate at which this optical regenerative repeater can receive. The one-bit length detecting circuit 303 detects the number of the consecutive same signs of the electric data signals with the latch output 302 entered from the D-type flip-flop 301. This operation is continued for a sufficiently long duration relative to the one-bit time length of the entered electric data signals. The smallest number of the consecutive same signs then obtained is judged to be the one-bit length of the received electric data signals. The sufficiently long duration in this context is supposed to be one second for a bit rate of 10 Gb/s for instance.

For example, it is supposed that the oscillation frequency of the VCO 224 is 10 GHz, and the bit rates at which reception is done are 10 Gb/s, 2.4 Gb/s and 600 Mb/s. Then, for the reception bit rates of 10 Gb/s, 2.4 Gb/s and 600 Mb/s, the smallest number of the consecutive same signs will be "1", "4" and "16", respectively. On the basis of these results, the bit rate is detected.

Figure 11:
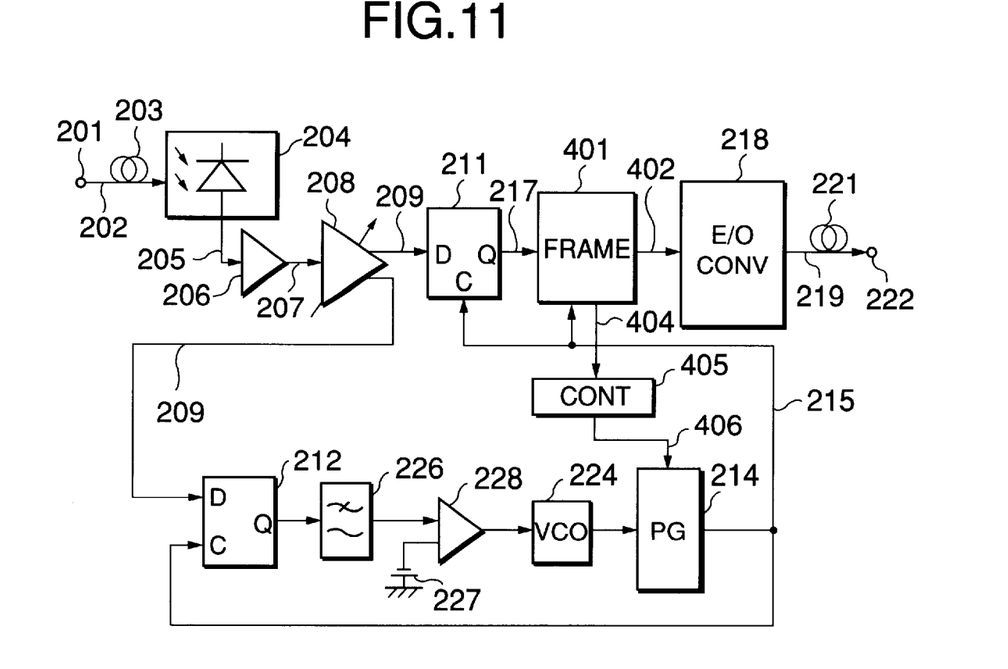
FIG. 11 is a block diagram illustrating the configuration of a bit rate-selective type optical regenerative repeater, which is a third preferred embodiment of the invention.

FIG. 11 illustrates the configuration of a bit rate-selective type optical regenerative repeater, which is a third preferred embodiment of the invention. In this diagram, the same parts as in the first embodiment illustrated in FIG. 3 are assigned the same reference signs, and their description is dispensed with as appropriate. In this optical regenerative repeater, an electric data signal supplied from the output terminal Q of the discriminating circuit 211 is entered into a frame synchronization circuit (FRAME) 401. The FRAME 401, having a configuration and functions conforming to ITU-T G.783, detects a signal for frame synchronization inserted into a prescribed position in the frame format of the electric signal 217 conforming to the SDH standard, and thereby detects the leading position of the frame. From the FRAME 401 is supplied to a control circuit 405, as output 402, the same signal as the entered electric data signal 217. The control circuit 405 refers to information 404 and, if no frame synchronization is achieved, supplies frequency division ratio indicating information 406 to alter the frequency division ratio to some other value. If it finds frame synchronization achieved, it supplies frequency division ratio indicating information 405 to keep the current frequency division ratio. The PG 214 sets the frequency division ratio in accordance with the frequency division ratio indicating information 406 which has been entered. For this reason, this optical regenerative repeater is not provided with the pulse counter 213 and the bit rate detector 232, both referred to in FIG. 3.

The operation of this optical regenerative repeater, which is the third preferred embodiment of the invention, will be described next. In this embodiment, it is presupposed that a bit for frame synchronization is inserted into the optical signal 202 to be entered into the optical signal input terminal 201 in advance on the transmitting side. The FRAME 401 detects the frame synchronization bit contained in the electric data signal 217 supplied from the discriminating circuit 211 to control frame synchronization, and judges whether or not the received electric data signal 217 is in a frame-synchronized state. Into the control circuit 405 is entered the information 404 indicating whether or not the signal is in this frame-synchronized state. If, referring to the information 404, the control circuit 405 finds that the signal is in a frame-synchronized state, it supplies information to keep the current ratio of frequency division as frequency division ratio indicating information 406 to the PG 214. On the other hand, if the signal is found out of frame synchronism, information to switch the frequency division ratio successively is supplied to the PG 214 as frequency division ratio indicating information 406. In this case, the frequency of the clock signal 215 supplied from the PG 214 is switched. The operation described above ensures that a frame-synchronized state be achieved only when the bit rate of the received optical signal 202 coincides with the frequency of the clock signal regenerated within the optical regenerative repeater, and normal clock generation be accomplished.

Figure 12:
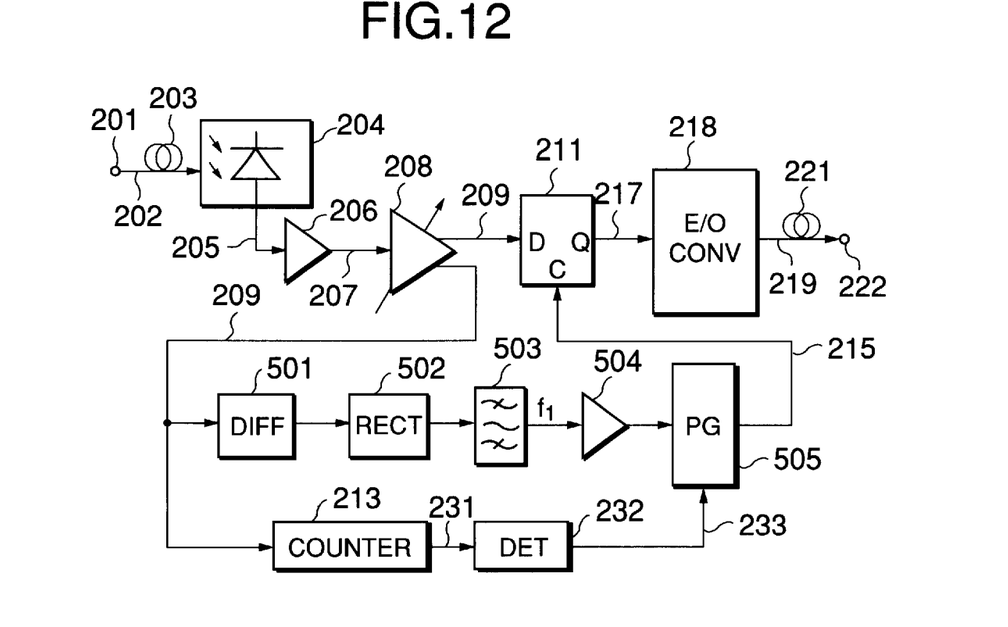
FIG. 12 is a block diagram illustrating the configuration of a bit rate-selective type optical regenerative repeater, which is a fourth preferred embodiment of the invention.

FIG. 12 illustrates the configuration of a bit rate-selective type optical regenerative repeater, which is a fourth preferred embodiment of the invention. In this diagram, the same parts as in the first embodiment illustrated in FIG. 3 are assigned the same reference signs, and their description is dispensed with as appropriate. In this optical regenerative repeater, which is the fourth embodiment of the invention, an electric data signal 209 supplied from the variable gain amplifier 208 is entered into both the pulse counter 213 and the differentiating circuit 501. On the output side of the differentiating circuit 501 are disposed a rectifying circuit 502, a timing extracting filter 503, a limiter amplifier 504 and a pulse generator (PG) 505 in this order. Into the PG 505 is entered a detection result 233 from the bit rate detector 232, and the frequency division ratio is set. A clock signal 215 is supplied from the PG 505 to the discriminating circuit 211.

The operation of this optical regenerative repeater, which is the fourth preferred embodiment of the invention, will be described next. The timing regenerating means in the first embodiment shown in FIG. 3 uses nonlinear extraction. Thus in this fourth embodiment illustrated in FIG. 12, a timing emission line spectral component is generated by entering the electric data signal 209, supplied from the variable gain amplifier 208, into the differentiating circuit 501 and the rectifying circuit 502. The timing extracting filter 503, into which this emission line spectral component is entered, extracts the same frequency component as the highest bit rate the optical regenerative repeater can receive.

The PG 505 may have the same configuration as the PG 2141 or 2142 referred to in FIG. 4 or 5, respectively. The PG 505 selectively supplies the clock signal 215, consisting of a frequency equal to the quotient of the division of the frequency extracted by the timing extracting filter 503 by a natural number, according to the detection result 233 supplied from the bit rate detector 232.

Figure 13:
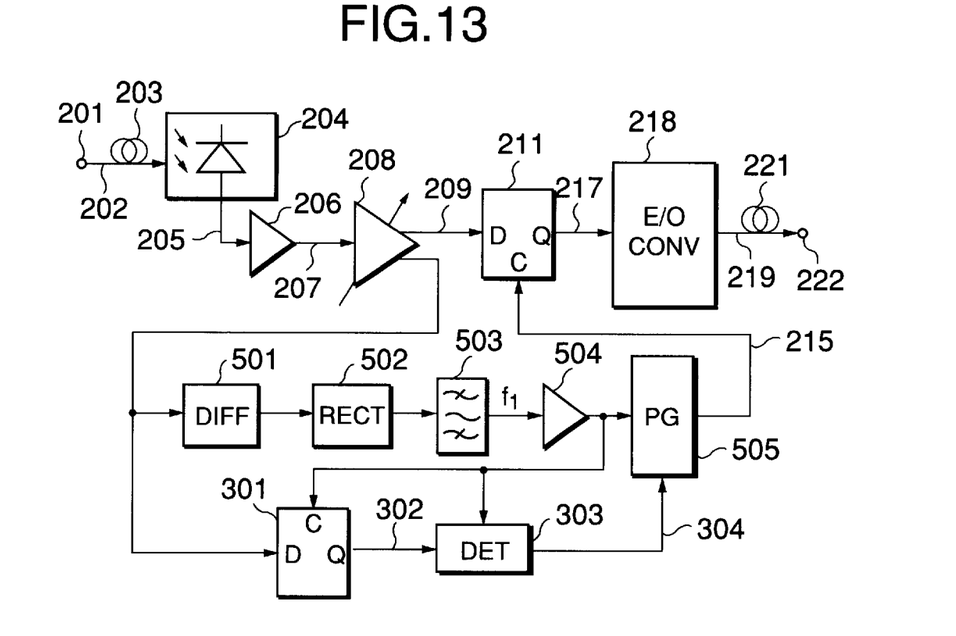
FIG. 13 is a block diagram illustrating the configuration of a bit rate-selective type optical regenerative repeater, which is a fifth preferred embodiment of the invention.

FIG. 13 illustrates the configuration of a bit rate-selective type optical regenerative repeater, which is a fifth preferred embodiment of the invention. In this diagram, the same parts as in the first embodiment illustrated in FIG. 3 are assigned the same reference signs, and their description is dispensed with as appropriate. In this optical regenerative repeater, which is the fifth embodiment of the invention, a circuit section consisting of the differentiating circuit 501, the rectifying circuit 502, the timing extracting filter 503, the limiter amplifier 504 and the PG 505, all referred to in FIG. 12 as constituent elements of the fourth embodiment, is disposed between the output side of the variable gain amplifier 208 and the clock terminal C of the discriminating circuit 211. Further, a circuit section consisting of the D-type flip-flop circuit 301 and the one-bit length detecting circuit 303, both referred to in FIG. 10 as constituent elements of the second embodiment, is disposed between the output side of the variable gain amplifier 208 and the detection output 304 of the PG 505.

In this fifth preferred embodiment of the invention, the bit rate detecting means, referred to in FIG. 3 as a constituent element of the first embodiment, is supposed to detect the one-bit length of the received optical signal. The timing regenerating means uses nonlinear extraction.

Referring to FIG. 13, the D-type flip-flop circuit 301, into which a data signal is entered from the variable gain amplifier 208, latches it with the output clock of the limiter amplifier, which is the same frequency as the highest bit rate this optical regenerative repeater can receive. The one-bit length detecting circuit 303 detects by the latched output 302 from the D-type flip-flop circuit 301 the number of the consecutive same signs of the electric data signals, and judges that the smallest number of the consecutive same signs is the one-bit length of the received data signals within a sufficiently long period of time relative to the bit rate of the entered electric data signals. The sufficiently long period of time in this context is supposed to be one second for a bit rate of 10 Gb/s for instance.

For example, it is supposed that the oscillation frequency of the VCO 224 is 10 GHz, and the bit rates at which reception is done are 10 Gb/s, 2.4 Gb/s and 600 Mb/s. Then, for the reception bit rates of 10 Gb/s, 2.4 Gb/s and 600 Mb/s, the smallest number of the consecutive same signs will be "1", "4" and "16", respectively. On the basis of these results, the bit rate is detected.

Further, in the differentiating circuit 501 and the rectifying circuit 502, a timing emission line spectral component is generated by entering the electric data signal 209 supplied from the variable gain amplifier 208. The timing extracting filter 503, into which this emission line spectral component is entered, extracts the same frequency component as the highest bit rate the optical regenerative repeater can receive. The PG 505 may have the same configuration as the PG 2141 or 2142 referred to in FIGS. 4 or 5, respectively. The PG 505 selectively supplies the clock signal 215, consisting of a frequency equal to the quotient of the division of the frequency extracted by the timing extracting filter 503 by a natural number, according to the detection result 233 supplied from the bit rate detector 232.

Figure 14:
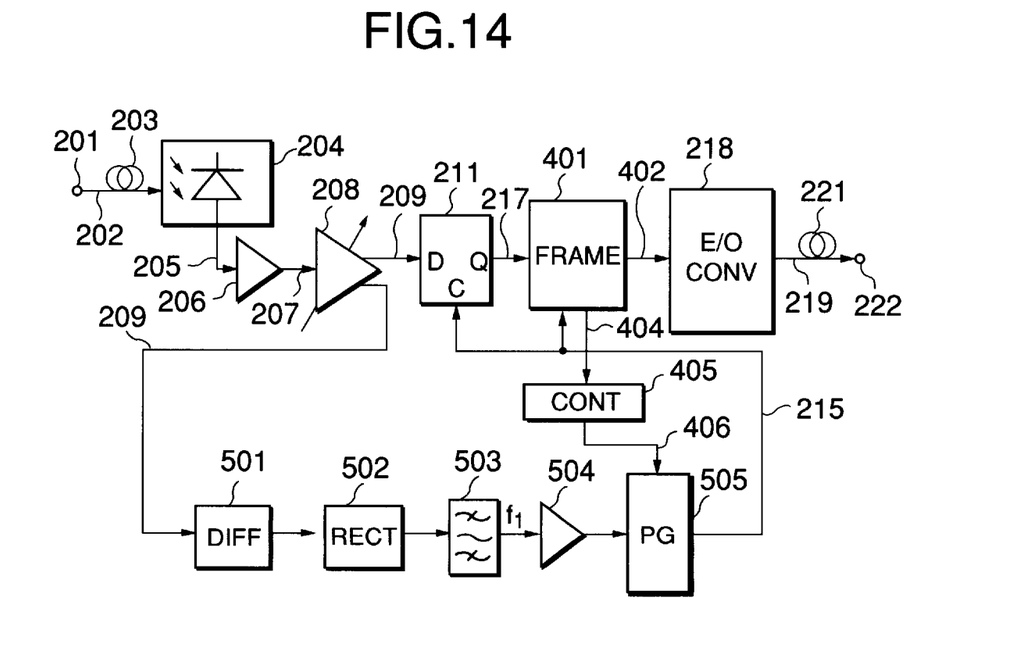
FIG. 14 is a block diagram illustrating the configuration of a bit rate-selective type optical regenerative repeater, which is a sixth preferred embodiment of the invention.

FIG. 14 illustrates the configuration of a bit rate-selective type optical regenerative repeater, which is a sixth preferred embodiment of the invention. In this diagram, the same parts as in the first embodiment illustrated in FIG. 3 are assigned the same reference signs, and their description is dispensed with as appropriate. In this optical regenerative repeater, which is the sixth embodiment of the invention, a circuit section consisting of the differentiating circuit 501, the rectifying circuit 502, the timing extracting filter 503, the limiter amplifier 504 and the PG 505, all referred to in FIG. 12 as constituent elements of the fourth embodiment, is disposed between the output side of the variable gain amplifier 208 and the clock terminal C of the discriminating circuit 211. Further, as in FIG. 11, the frame synchronization circuit (FRAME) 401, disposed between the output terminal Q of the discriminating circuit 211 and the E/O converter 218, achieves frame synchronization by detecting a bit for frame synchronization. Information 404 supplied from the FRAME 401 to indicate whether or not a frame-synchronized state is achieved is entered into the control circuit 405, and frequency division ratio indicating information 406 to indicate whether or not the current frequency division ratio is to be maintained or altered to some other value is entered into the PG 505.

This optical regenerative repeater, which is the sixth embodiment of the invention, uses as detecting means the FRAME 401 in place of the bit rate detector in the first embodiment. The timing regenerating means uses nonlinear extraction.

In the optical signal 202 to be entered into the optical regenerative repeater illustrated in FIG. 14, a bit for frame synchronization is inserted in advance on the transmitting side. The FRAME 401 detects the frame synchronization bit from the electric data signal 217 supplied from the discriminating circuit 211 to accomplish frame synchronization, and judges whether or not the received electric data signal 217 is in a frame-synchronized state. Into the control circuit 405 is entered the information 404 indicating whether or not the signal is in this frame-synchronized state. If the control circuit 405 finds that the signal is in a frame-synchronized state, it supplies information to keep the current ratio of frequency division as frequency division ratio indicating information 406 to the PG 505. On the other hand, if the signal is found out of frame synchronism, information to switch the frequency division ratio successively is supplied to the PG 505 as frequency division ratio indicating information 406. In this case, the frequency of the clock signal 215 supplied from the PG 505 is switched. The operation described above ensures that a frame-synchronized state be achieved only when the bit rate of the received optical signal 202 coincides with the frequency of the clock signal regenerated within the optical regenerative repeater, and normal clock generation be accomplished.

Further, in the differentiating circuit 501 and the rectifying circuit 502, a timing emission line spectral component is generated by entering the electric data signal 209 supplied from the variable gain amplifier 208. The timing extracting filter 503, into which this emission line spectral component is entered, extracts the same frequency component as the highest bit rate the optical. regenerative repeater can receive. The PG 505 may have the same configuration as the PG 2141 or 2142 referred to in FIGS. 4 or 5, respectively. The PG 505 selectively supplies the clock signal 215, consisting of a frequency equal to the quotient of the division of the frequency extracted by the timing extracting filter 503 by a natural number, according to the detection result 233 supplied from the bit rate detector 232.

Figure 15:
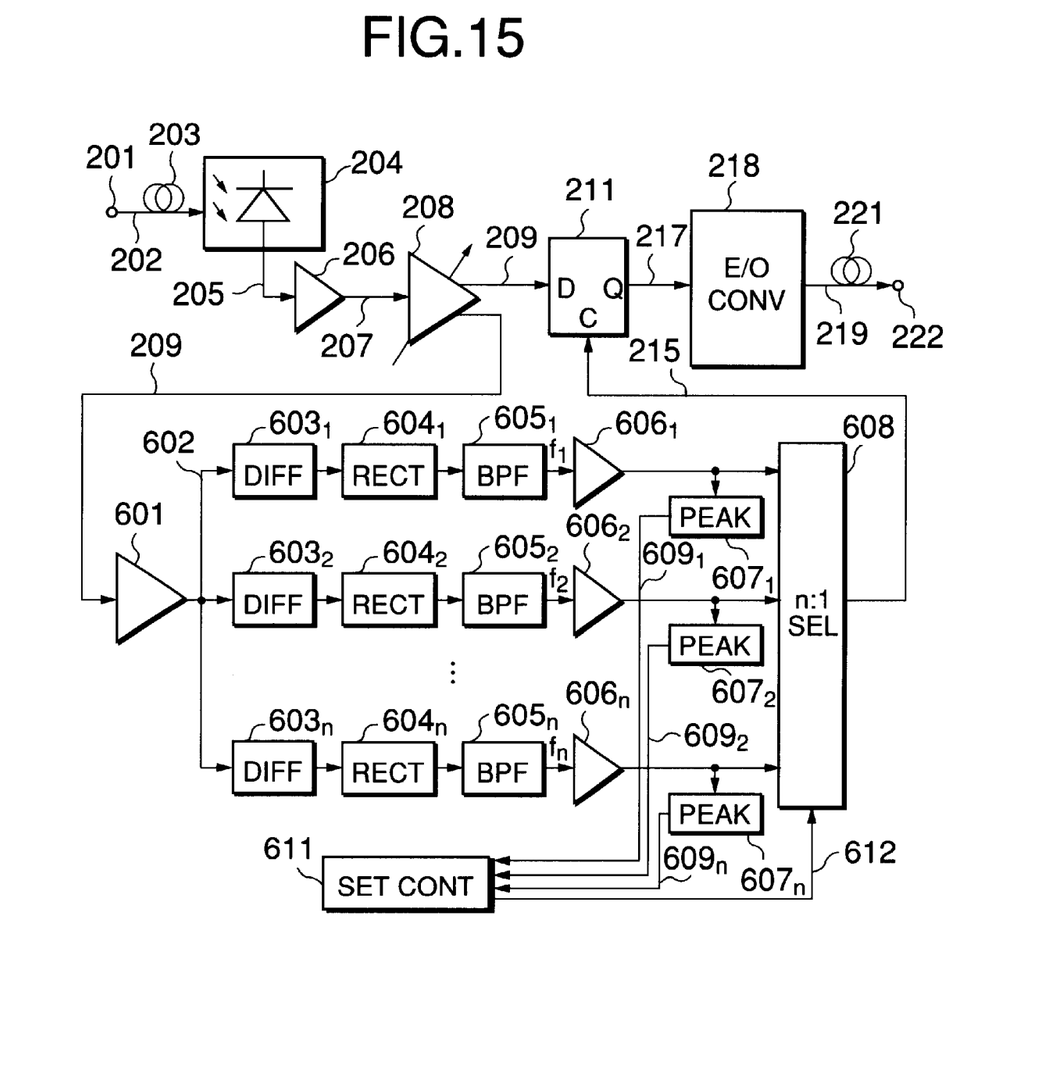
FIG. 15 is a block diagram illustrating the configuration of a bit rate-selective type optical regenerative repeater, which is a seventh preferred embodiment of the invention.

FIG. 15 illustrates the configuration of a bit rate-selective type optical regenerative repeater, which is a seventh preferred embodiment of the invention. In this diagram, the same parts as in the first embodiment illustrated in FIG. 3 are assigned the same reference signs, and their description is dispensed with as appropriate. This optical regenerative repeater, which is the seventh embodiment of the invention, is provided with an amplifier 601 for amplifying the electric data signal supplied from the variable gain amplifier 208. An electric data signal 602, having been amplified by the amplifier 601, is entered distributively into first to nth differentiating circuits (DIFFs) 6031 to 603$n$. To the output side of the first DIFF 6031 is connected a series circuit consisting of a rectifying circuit (RECT) 6041, a timing extracting filter (BPF) 6051 and a limiter amplifier 6061, and on its output side are connected a peak detector (PEAK) 6071 and an n:1 selecting circuit (n:1SEL) 608. A peak value information unit 6091 detected by the PEAK 6071 is entered into a selective control circuit (SEL CONT) 611.

On the output side of the second to nth DIFFs 6032 to 603$n$ are also connected, as on the output side of the first DIFF 6031, series circuits respectively consisting of RECTs 6042 to 604$n$, BPFs 6052 to 605$n$, and limiter amplifiers 6062 to 606$n$, and on their output side are connected PEAKs 6072 to 607$n$ and the common n:1SEL 608 shared by them. Peak value information units 6092 to 609$n$ respectively detected by the PEAKs 6072 to 607$n$ are entered into the SEL CONT 611. The SEL CONT 611 detects the clock signal of the frequency to obtain the highest of the peak values among all the peak value information units 6091 to 609$n$, and supplies the n:1SEL 608 a selection indicating signal 612 to select the clock signal of this frequency. From the n:1SEL 608 is delivered the relevant clock signal 215 to the clock input terminal C of the discriminating circuit 211.

This optical regenerative repeater, which is the seventh embodiment of the invention, uses timing regeneration circuit using nonlinear extraction as detecting means in place of the timing regenerating circuit in the first embodiment. The bit rate detecting circuit uses detection of the peak value of regenerated timing signals.

In FIG. 15, the first DIFF 6031 and the RECT 6041 on its output side, into which the electric data signal 209 supplied from the variable gain amplifier 208 is entered, generate a timing emission line spectral component of f1 in frequency. The BPF 6051, into which this timing emission line spectral component is entered, extracts the frequency component f1. The limiter amplifier 6061 amplifies the frequency component f1 thereby obtained, and delivers it to the n:1SEL 608 and the PEAK 6071. The electric data signals 209 entered into the second to nth differentiating circuits 6032 to 603$n$ are similarly processed. In this manner, clock signal regeneration is accomplished with respect to not only the frequency component f1 but also frequency components f2 to fn. The n:1SEL 608, into which clock signals of these frequency components f1 to fn, respectively supplied by the limiter amplifiers 6061 to 606n, selects one type of clock signal 215 out of them, as will be described below, and supplies it to the discriminating circuit 211.

On the other hand, the PEAKs 6071 to 607n, into which clock signals of these frequency components f1 to fn are entered, detect their respective peak values. These peak value information units 6091 to 609n are entered into the SEL CONT 611, and the clock signal of the frequency to achieve the highest of the peak values among all the peak value information units is detected. As a result, the clock signal 215 is supplied from the n:1SEL 608 to the discriminating circuit 211. In this embodiment of the invention, timing regeneration is accomplished in this manner to achieve optical regenerative repeating.

The bit rate-selective type optical regenerative repeater according to the invention provides the following benefits. Thus, according to the invention, the bit rate of optical signals entered from an optical fiber constituting the transmission path is detected, and the frequency of clock signals regenerated within the optical regenerative repeater is switched in accordance with the result of detection. Accordingly, there is no need to provide an optical transmitting/receiving circuit for transmitting/receiving clock signals separately from data signals. It is thereby made possible to realize a less expensive bit rate-independent type optical regenerative repeater.

Further according to the invention, there is no need to provide any wavelength for transmitting and receiving clock signals separately from data signals. Accordingly, the optical wavelength band can be effectively used even for extension to a wavelength division multiplexing (WDM) system, resulting in enhanced transmission efficiency.

Moreover, according to the invention, since clock signals are regenerated from received optical signals and repeated, there is the additional benefit of improving the signal-to-noise ratio and eliminating waveform deterioration in each optical repeater.

While this invention has been described in connection with certain preferred embodiments thereof, it is to be understood that the subject matter encompassed by way of this invention is not limited to those specific embodiments. On the contrary, it is intended for the subject matter of the invention to cover all such alternatives, modifications and equivalents as can be included within the spirit and scope of the following claims.

What is claimed is:

1. A receiving apparatus comprising:
   a counter for counting for a prescribed period of time the number of bits having one of two different levels, out of bits forming a digital signal which is entered and having the two different levels, and supplying a count signal;
   a bit rate detector for calculating the bit rate of said digital signal from the count signal and supplying a multiplying factor selection signal;
   a differentiating circuit, into which said input digital signal is entered, for supplying a pulse signal at a varying point of said input digital signal;
   a rectifying circuit for accomplishing full-wave rectification of the pulse signal, and supplying a rectified pulse signal;
   a band-pass filter for passing harmonics of the clock component of said input digital signal contained in the rectified pulse signal; and
   a frequency dividing circuit, into which said harmonics are entered, for frequency-dividing said harmonics by a ratio set on the basis of said multiplying factor selection signal, and supplying a resultant frequency-dividing clock signal.

2. A receiving apparatus, as claimed in claim 1, further comprising:
   a discriminating circuit for discriminating and regenerating said input digital signal with said multiplied clock signal, and supplying a resultant discriminated/regenerated signal.

3. A receiving apparatus, as claimed in claim 2, further comprising a photoelectric converter for converting an optical signal, which is entered, into an input digital signal.

4. A receiving apparatus, as claimed in claim 3, further comprising an electro-optical converter for converting said discriminated/regenerated signal into an optical signal.

5. A receiving apparatus comprising:
   a counter, into which are entered a digital signal and a clock having a frequency not lower than the bit rate of the digital signal, for measuring in terms of the number of periods of said clock the duration of one of two different levels, out of bits forming said digital signal and having the two different levels, and supplying the duration as a bit length signal; and
   a one-bit length detecting circuit, into which said bit length signal is entered, for calculating the shortest duration of said one of the two levels and supplying a multiplying factor selection signal;
   a differentiating circuit, into which said input digital signal is entered, for supplying a pulse signal at a varying point of said input digital signal;
   a rectifying circuit for accomplishing full-wave rectification of the pulse signal, and supplying a rectified pulse signal;
   a band-pass filter for passing harmonics of the clock component of said input digital signal contained in the rectified pulse signal; and
   a frequency dividing circuit, into which said harmonics are entered, for frequency-dividing said harmonics by a ratio set on the basis of said multiplying factor selection signal, and supplying a resultant frequency-divided clock signal.

6. A receiving apparatus, as claimed in claim 5, further comprising:
   a discriminating circuit for discriminating and regenerating said input digital signal with said multiplied clock signal, and supplying a resultant discriminated/regenerated signal.

7. A receiving apparatus, as claimed in claim 6, further comprising a photoelectric converter for converting an optical signal, which is entered, into an input digital signal.

8. A receiving apparatus, as claimed in claim 7, further comprising an electro-optical converter for converting said discriminated/regenerated signal into an optical signal.

9. A receiving apparatus comprising:
   a plurality of timing extracting circuits set to extract mutually different frequencies, each further provided with:
   a differentiating circuit, into which an input digital signal is entered, for supplying a pulse signal at a varying point of said input digital signal;
   a rectifying circuit for accomplishing full-wave rectification of the pulse signal, and supplying a rectified pulse signal;
   a band-pass filter, into which the rectified pules signal is entered, for selectively supplying a sine wave signal having a predetermined frequency; and a power detecting circuit, into which the sine wave signal is entered, for supplying a power signal having a parameter which varies montonously with the input signalpower;

a selecting circuit, into which said sine wave signals are entered, for selecting one of the input signals in accordance with a selection signal entered from outside, and supplying the selected sine wave signal; and a selection control circuit, into which said power signals are entered, for generating said selection signal for selecting said sine wave signal having the greatest power, and feeding it to said selecting circuit.

10. A receiving apparatus, as claimed in claim 9, further comprising:

a discriminating circuit for discriminating and regenerating said input digital signal with said multiplied clock signal, and supplying a resultant discriminated/regenerated signal.

11. A receiving apparatus, as claimed in claim 10, further comprising a photoelectric converter for converting an optical signal, which is entered, into an input digital signal.

12. A receiving apparatus, as claimed in claim 11, further comprising an electro-optical converter for converting said discriminated/regenerated signal into an optical signal.

13. A receiving apparatus comprising:

a differentiating circuit, into which an input digital signal is entered, for supplying a pulse signal at a varying point of said input digital signal;

a rectifying circuit for accomplishing full-wave rectification of the pulse signal, and supplying a rectified pulse signal;

a band-pass filter for passing harmonics of the clock component of said input digital signal contained in the rectified pulse signal;

a frequency dividing circuit, into which said harmonics are entered, for frequency-dividing said harmonics by a ratio set on the basis of said multiplying factor selection signal, and supplying a resultant frequency-divided clock signal;

a discriminating circuit for discriminating and regenerating said input digital signal with said frequency-divided clock signal, and supplying a resultant discriminated/regenerated signal;

a specific pattern detecting circuit for checking the discriminated/regenerated signal as to whether or not it has a specific pattern inserted into said input digital signal in advance, and supplying the result of checking as detection signal; and a control circuit, into which the detection signal is entered, for generating and supplying said multiplying factor selection signal to vary said multiplying factor successively until any of the detection signals indicates the presence of said specific pattern.

14. A receiving apparatus, as claimed in claim 13, further comprising a photoelectric converter for converting an optical signal, which is entered, into an input digital signal.

15. A receiving apparatus, as claimed in claim 14, further comprising an electro-optical converter for converting said discriminated/regenerated signal into an optical signal.

* * * * *